US009297653B2

(12) United States Patent
Lee et al.

(10) Patent No.: US 9,297,653 B2
(45) Date of Patent: Mar. 29, 2016

(54) LOCATION CORRECTION APPARATUS AND METHOD

(71) Applicant: Electronics and Telecommunications Research Institute, Daejeon (KR)

(72) Inventors: Seong-Ho Lee, Daejeon (KR); Jae-Chul Kim, Daejeon (KR); Yoon-Seop Chang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 441 days.

(21) Appl. No.: 13/693,370

(22) Filed: Dec. 4, 2012

(65) Prior Publication Data
US 2013/0279760 A1  Oct. 24, 2013

(30) Foreign Application Priority Data

Apr. 23, 2012  (KR) ........................ 10-2012-0042317

(51) Int. Cl.
*G06K 9/00* (2006.01)
*G01C 11/04* (2006.01)
*G01S 5/16* (2006.01)

(52) U.S. Cl.
CPC .. *G01C 11/04* (2013.01); *G01S 5/16* (2013.01)

(58) Field of Classification Search
None
See application file for complete search history.

(56) References Cited

U.S. PATENT DOCUMENTS

| 5,889,878 A * | 3/1999 | Togashi ........................ 382/103 |
| 2002/0134151 A1* | 9/2002 | Naruoka et al. ................ 73/291 |
| 2003/0068071 A1* | 4/2003 | Wilson .......................... 382/103 |
| 2004/0130484 A1 | 7/2004 | Krasner |
| 2008/0140638 A1* | 6/2008 | Bruno ............................. 707/4 |
| 2008/0273757 A1* | 11/2008 | Nakamura et al. ............ 382/104 |
| 2010/0114374 A1* | 5/2010 | Cho et al. ...................... 700/259 |
| 2010/0131195 A1* | 5/2010 | Jung et al. ..................... 701/208 |
| 2011/0135207 A1* | 6/2011 | Flynn et al. ................... 382/209 |
| 2011/0143779 A1* | 6/2011 | Rowe et al. ................. 455/456.3 |
| 2011/0235923 A1* | 9/2011 | Weisenburger et al. ...... 382/201 |
| 2012/0163662 A1* | 6/2012 | Lee et al. ...................... 382/103 |
| 2012/0310968 A1* | 12/2012 | Tseng .......................... 707/769 |

* cited by examiner

*Primary Examiner* — Sumati Lefkowitz
*Assistant Examiner* — Carol Wang
(74) *Attorney, Agent, or Firm* — Rabin & Berdo, P.C.

(57) ABSTRACT

Disclosed herein is a location correction apparatus and method. The location correction apparatus includes a reference object search unit for searching a pre-stored geographic object database (DB) for one or more objects corresponding to objects included in a captured image and setting a reference object to be used to correct a location among the one or more objects that have been found. A reference point extraction unit sets reference points from the set reference object. A location determination unit obtains an actual distance between the reference points and calculates a location using the actual distance, a distance between the reference points included in the captured image, and metadata of the captured image. Therefore, the present invention can improve positioning accuracy and can be applied to high-quality location-based services or space information services thanks to the improved accuracy.

9 Claims, 6 Drawing Sheets

LOCATION CORRECTION APPARATUS AND METHOD

CROSS REFERENCE TO RELATED APPLICATION

This application claims the benefit of Korean Patent Application No. 10-2012-0042317, filed on Apr. 23, 2012, which is hereby incorporated by reference in its entirety into this application.

BACKGROUND OF THE INVENTION

1. Technical Field

The present invention relates generally to location determination technology and, more particularly, to a location correction apparatus and method that are capable of improving the accuracy of obtained location information.

2. Description of the Related Art

Location determination technology (or positioning technology) for mobile terminals is technology for determining the current location of a mobile terminal. As such location determination technology, a network-based location determination scheme or a terminal-based positioning scheme has been mainly used, wherein the network-based location determination scheme determines a location using a reception signal, received by a mobile terminal from a base station, and the terminal-based positioning scheme determines the location using a Global Positioning System (GPS) receiver mounted on a mobile terminal.

Further, location determination technology for mobile terminals is also implemented using a method of creating a fingerprint corresponding to signal intensity in a wireless Local Area Network (LAN) environment, mapping the created fingerprint to the Radio Frequency (RF) value of a radio signal in the mobile terminal, and determining the location of the mobile terminal.

However, the above-described location determination methods for mobile terminals are disadvantageous in that there is a positioning error due to the influence of fading caused by buildings or the like in a downtown area having a large number of multistoried buildings.

U.S. Pat. No. 6,816,111 discloses technology for correcting a received location based on values belonging to a set of estimated errors for signals of a GPS provided in a mobile terminal. However, the above patent is limited in the correction of the positioning errors because only GPS signals are corrected based on estimated error values for the GPS signals.

Therefore, a method capable of more accurately correcting determined location information is required.

SUMMARY OF THE INVENTION

Accordingly, the present invention has been made keeping in mind the above problems occurring in the prior art, and an object of the present invention is to provide a location correction apparatus that is capable of improving the accuracy of obtained location information.

Another object of the present invention is to provide a location correction method that is capable of improving the accuracy of obtained location information.

In accordance with an aspect of the present invention to accomplish the above objects, there is provided a location correction apparatus including a reference object search unit for searching a pre-stored geographic object database (DB) for one or more objects corresponding to objects included in a captured image and setting a reference object to be used to correct a location among the one or more objects that have been found, a reference point extraction unit for setting reference points from the set reference object, and a location determination unit for obtaining an actual distance between the reference points and calculating a location using the actual distance, a distance between the reference points included in the captured image, and metadata of the captured image.

Preferably, the reference object search unit may set an object located closest to a capturing location of the captured image, among the found one or more objects, as the reference object.

Preferably, the reference point extraction unit may extract a contour of the set reference object from the captured image and set at least two corners of the extracted contour as the reference points.

Preferably, the location determination unit may calculate the actual distance between the reference points using actual coordinates of the reference points included in the captured image, and calculate the location using the actual distance, the distance between the reference points in the captured image, an angle of view of the captured image, and a size of the captured image.

Preferably, the location determination unit may correct an obtained initial location using the calculated location.

In accordance with another aspect of the present invention to accomplish the above objects, there is provided a location correction method including receiving information about an initial location and an image captured at the initial location, searching a geographic object database (DB) for one or more objects corresponding to objects included in the captured image, and setting a reference object among the one or more objects that have been found, and calculating a location at which the image was captured using actual geographic information of the reference object and information about the captured image.

Preferably, the receiving the information about the initial location and the image captured at the initial location may be configured to receive the initial location information, heading angle information, and metadata of the captured image.

Preferably, the setting the reference object may include searching the geographic object DB for one or more candidate objects to be set as the reference object among the objects included in the captured image, setting the reference object among the found one or more candidate objects, extracting a contour of the set reference object, and setting at least two reference points based on the extracted contour.

Preferably, the setting the reference object among the found one or more candidate objects may be configured to set an object located closest to the initial location, among the one or more candidate objects, as the reference object.

Preferably, the calculating the location at which the image was captured may include calculating an actual distance between the reference points using actual coordinates of the reference points included in the captured image, and calculating the location at which the image was captured using the actual distance, a distance between the reference points in the captured image, an angle of view of the captured image, and a size of the captured image, and correcting the initial location information using the calculated location at which the image was captured.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
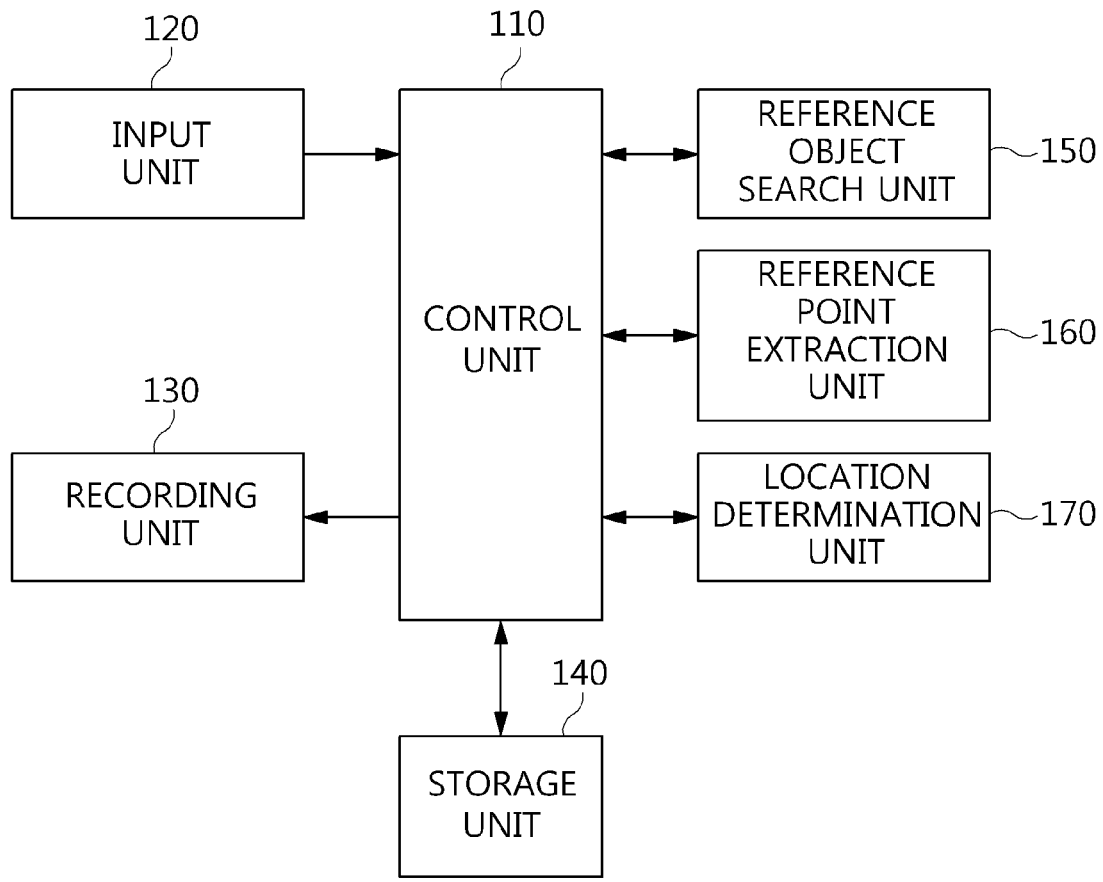
FIG. 1 is a block diagram showing the configuration of a location correction apparatus according to an embodiment of the present invention.

The present invention will be described in detail below with reference to the accompanying drawings. In the following description, redundant descriptions and detailed descriptions of known functions and elements that may unnecessarily make the gist of the present invention obscure will be omitted. Embodiments of the present invention are provided to fully describe the present invention to those having ordinary knowledge in the art to which the present invention pertains. Accordingly, in the drawings, the shapes and sizes of elements may be exaggerated for the sake of clearer description.

Hereinafter, preferred embodiments of the present invention will be described in detail with reference to the attached drawings.

A location correction method according to an embodiment of the present invention corrects location information obtained by comparing image data, captured by a device capable of obtaining location information, and metadata included in the image data with corresponding data of a geographic information database (DB) or by performing mapping or the like.

Methods of extracting the contour of a building object included in an image are implemented using an algorithm, such as line approximation, convex hull, or Hough transform.

The line approximation algorithm is a method of representing a minimum number of lines so as to find the feature points (the contour) of an object. Here, the term "contour" denotes a method of representing the features of an object using a minimum number of points by eliminating points that are redundant, unimportant, and superfluous when representing the object. The line approximation algorithm is occasionally implemented as a method that uses an angle or a distance between adjacent points. The convex hull algorithm denotes a method of finding an outermost convex point from a set of any points. The Hough transform algorithm denotes a method of extracting geometric primitives from a pixel-based raster image.

Meanwhile, a camera or device equipped with a camera stores metadata, such as the focal length and a field of view (or an angle of view) of a lens, together with captured image data, when a predetermined image is captured.

The location correction method according to an embodiment of the present invention calculates an accurate location using the metadata of the captured image data, information about a contour and/or surfaces extracted from a building or the like included in the captured image, and pieces of geographic object data stored in a geographic information DB and corrects the measured initial location information in order to minimize errors in the location information measured using a Global Positioning System (GPS) or wireless LAN technology, thus reducing positioning errors.

Figure 2:
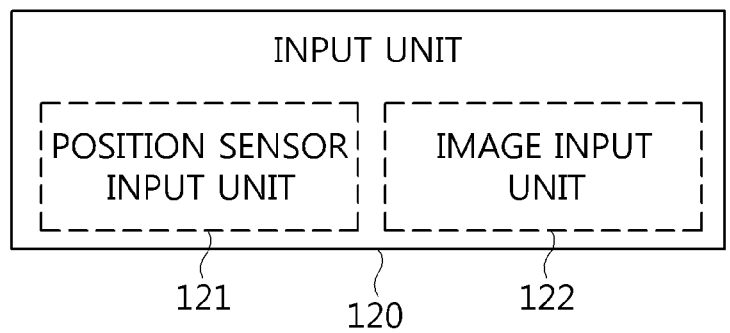
FIG. 2 is a block diagram showing the detailed configuration of the input unit of FIG. 1.

FIG. 1 is a block diagram showing the configuration of a location correction apparatus according to an embodiment of the present invention. FIG. 2 is a block diagram showing the detailed configuration of the input unit of FIG. 1.

Referring to FIGS. 1 and 2, a location correction apparatus 100 according to an embodiment of the present invention may include a control unit 110, an input unit 120, a recording unit 130, a storage unit 140, a reference object search unit 150, a reference point extraction unit 160, and a location determination unit 170.

The control unit 110 controls the operations of individual components 120 to 170 of the location correction apparatus 100. Further, the control unit 110 relays and manages data and control messages among the components 120 to 170 of the location correction apparatus 100.

The input unit 120 is a means for receiving location information and an image. The input unit 120 can be provided with GPS location information (coordinates) and capturing direction angle (heading angle) information from a GPS receiver (not shown), and can also be provided with a captured image and the metadata of the image from a capturing device, such as a camera. In this case, the input unit 120 can provide the received location information, the image, and the metadata of the image to the reference object search unit 150 via the control unit 110.

In detail, as shown in FIG. 2, the input unit 120 may include a position sensor input unit 121 and an image input unit 122.

The position sensor input unit 121 takes charge of the reception of GPS location signals (for example, GPS coordinates), the heading angle, etc. that are provided by the GPS receiver. Further, the image input unit 122 takes charge of the reception of a captured image or a stored image and the metadata of the image (for example, a field of view, a focal length, etc.).

The recording unit 130 can display the location information and/or the heading angle that have been corrected and provided by the control unit 110, and include the corrected location information and/or the heading angle value in the captured image data.

The storage unit 140 stores geographic object data that has been accurately measured, searches for the corresponding data in response to a search request provided by another component, such as the control unit 110, and provides the found data. The storage unit 140 may include a geographic object DB system and may be implemented as a separate independent device. In this case, when the geographic object DB system is implemented as a separate independent device, the location correction apparatus may be connected to the geographic object DB system over a network and, for this, may further include a network interface for performing communication.

The reference object search unit 150 searches the storage unit 140 for objects (for example, buildings) included in the image by using the information provided by the input unit 120 (the initial location information, the image, the heading angle, the angle of view, etc.). Here, the reference object search unit 150 may search the DB stored in the storage unit 140 for one or more candidate objects corresponding to the objects included in the image even if the candidate objects are not accurate.

The reference object search unit 150 may set an object located closest to the capturing location of the image, among the found candidate objects, as a reference object, and use the reference object for location correction.

The reference point extraction unit 160 extracts the contour of the reference object (for example, a predetermined building), set by the reference object search unit 150 among the objects included in the image, from the reference object and determines reference points from the reference object.

The location determination unit 170 obtains the actual distance between the reference points determined by the reference point extraction unit 160 from the DB of the storage unit 140, and calculates the accurate location by means of the actual distance, the angle of view of the image, the size of the image, the distance between reference points included in the image, etc.

The location determination unit 170 can correct the initial location information using the location information accurately calculated in this way, and provide the corrected location information to the recording unit 130 via the control unit 110.

Hereinafter, a location correction method according to an embodiment of the present invention will be described in detail with reference to FIGS. 3 to 5.

Figure 3:
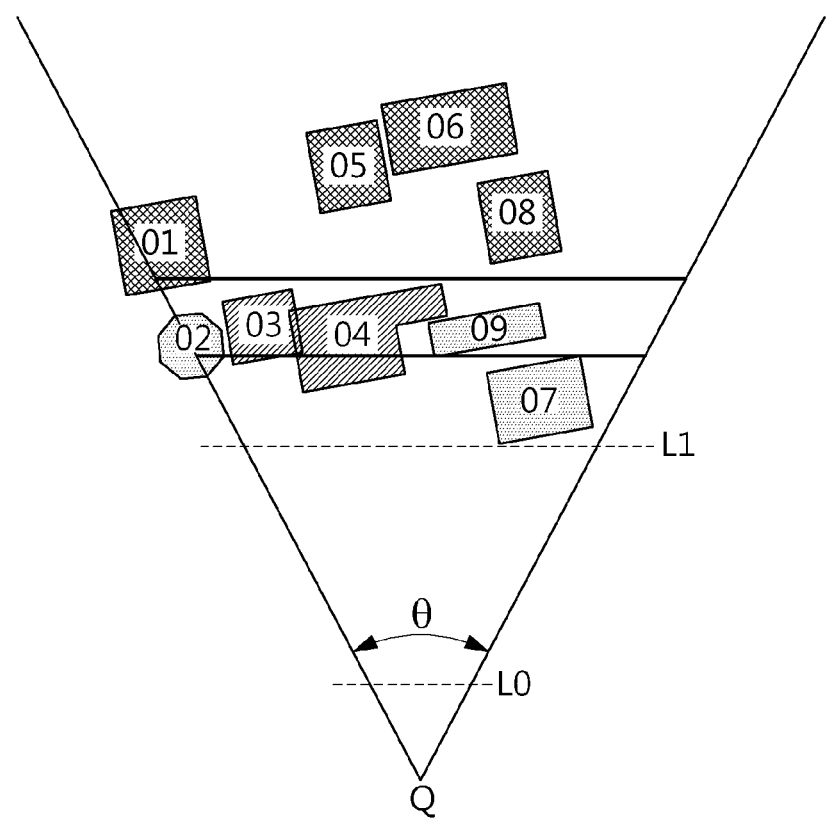
FIG. 3 is a conceptual diagram showing a reference object search procedure in a location correction method according to an embodiment of the present invention.

FIG. 3 is a conceptual diagram showing the procedure of searching for a reference object in the location correction method according to an embodiment of the present invention. This procedure can be performed by the reference object search unit 150 shown in FIG. 1.

Referring to FIG. 3, actual space objects O1 to O9 falling within an angle of view θ of a camera are included in an image captured by the camera. Here, the angle of view 8 of the camera can be obtained from the metadata of the image.

In this case, the reference object search unit 150 searches for space objects that intersect segments L0 and L1 meeting at right angles to a capturing direction C1 while moving the segments L0 and L1 from a capturing location (or the origin Q) along the capturing direction C1. In this case, the capturing location Q denotes the obtained initial location. The reference object search unit 150 can search for space objects using a plane sweep algorithm or the like.

For example, the reference object search unit 150 finds an object O7 intersecting the segment L1, and then includes the object O7 in a candidate object list. Further, the reference object search unit 150 detects space objects that intersect the segment L1 while maintaining the segment L1 at a location perpendicular to the capturing direction C1 and moving the segment L1 in a direction far away from the capturing location, and then includes the detected space objects in the candidate object list. Here, the reference object search unit 150 can be configured to search for objects falling within a predetermined distance from the capturing location according to a preset method or the settings of a user. The reference object search unit 150 maintains the candidate object list determined using the above search method. The reference object search unit 150 can set an object located closest to the origin Q, that is, 07, among objects included in the candidate object list, as the reference object.

Figure 4:
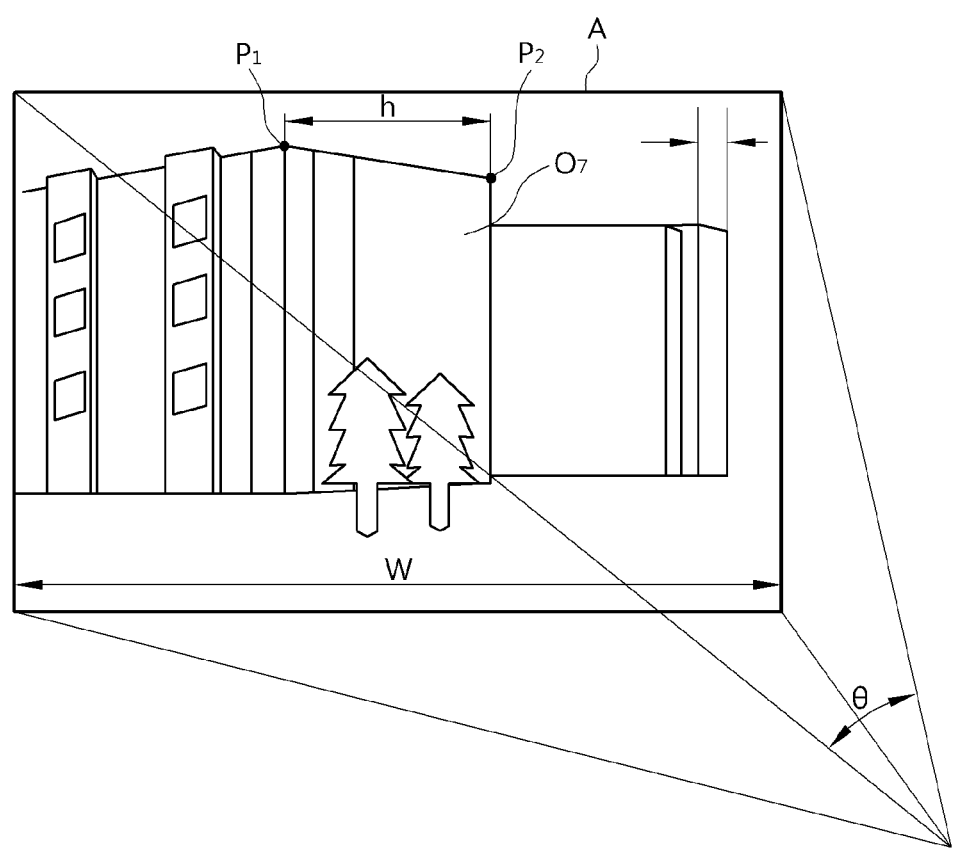
FIG. 4 is a conceptual diagram showing the extraction of the contour of an object in the location correction method according to an embodiment of the present invention.

FIG. 4 is a conceptual diagram showing the extraction of the contour of an object in the location correction method according to an embodiment of the present invention. This extraction can be performed by the reference point extraction unit 160 shown in FIG. 1. FIGS. 5 and 6 are conceptual diagrams showing the procedure of determining a location to be corrected in the location correction method according to an embodiment of the present invention. This procedure can be performed by the location determination unit 170 shown in FIG. 1.

First, referring to FIG. 4, the reference point extraction unit 160 extracts the contour of an object included in an image A provided by the input unit 120. Here, the reference point extraction unit 160 can extract the contour of a reference object using a well-known contour extraction algorithm, and can set upper corners of the reference object in the extracted contour of the reference object as reference points ($P_1$, $P_2$).

Figure 5:
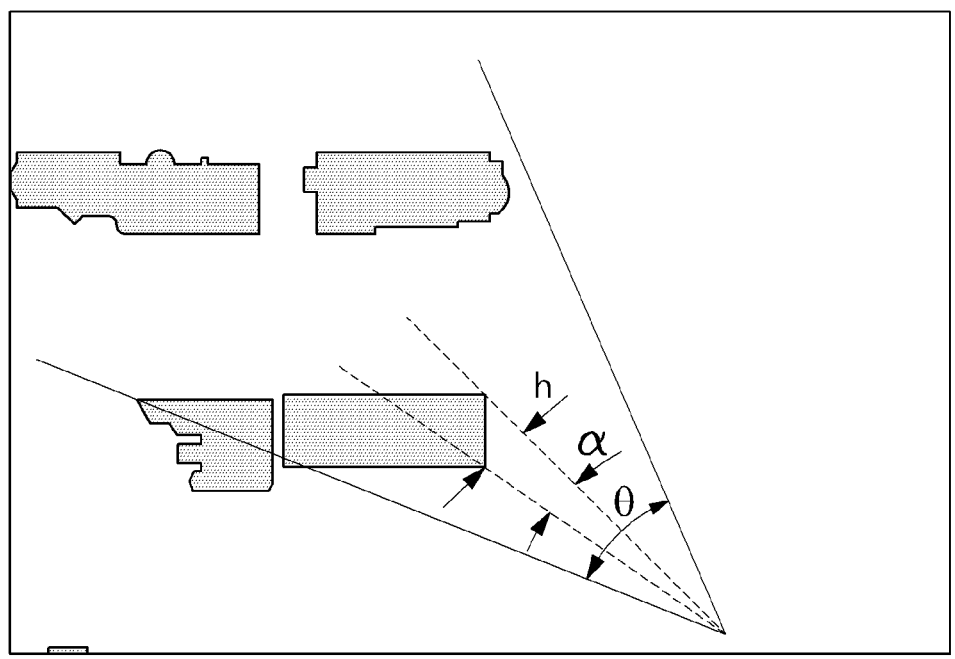
FIGS. 5 and 6 are conceptual diagrams showing the procedure of determining a location to be corrected in the location correction method according to an embodiment of the present invention.
Figure 6:
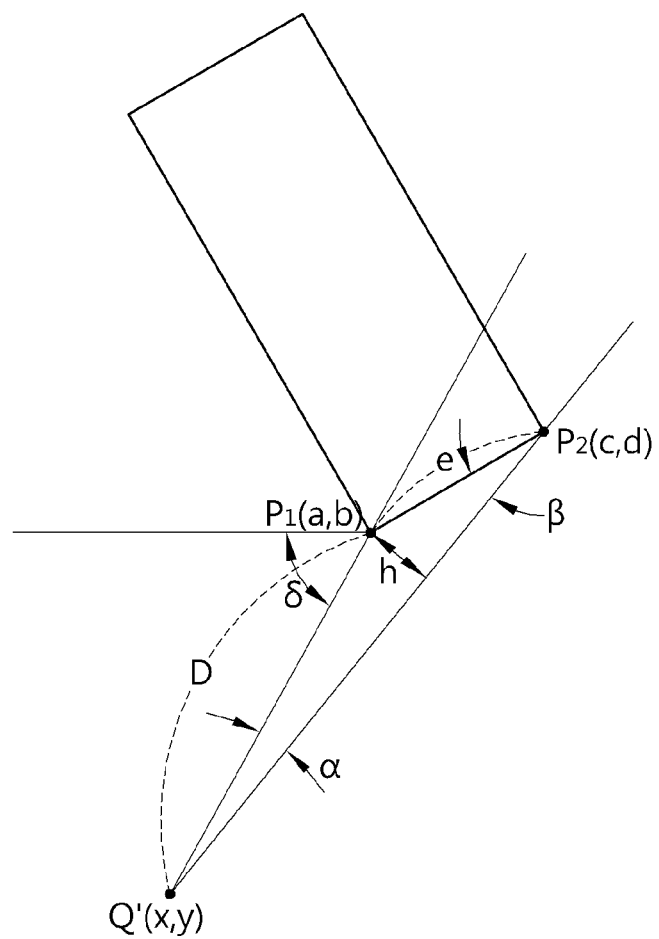

Referring to FIGS. 5 and 6, the location determination unit 170 calculates an angle between the reference points ($P_1$, $P_2$) extracted by the reference point extraction unit 160 and the capturing location or the origin by using the following Equation (1):

$$W:h = \theta:\alpha, \qquad (1)$$
$$\alpha = \frac{h \times \theta}{W}$$

In Equation (1), W denotes the lateral length of the image, and h denotes the distance between the reference points $P_1$ and $P_2$. Further, θ denotes the angle of view of the image, and α denotes the angle between the reference points ($P_1$, $P_2$) and the capturing location or the origin.

Further, the location determination unit 170 can calculate values of variables β, δ, and D shown in FIG. 6 using the following Equation (2):

$$\beta = \sin^{-1}\frac{h}{e}, \qquad (2)$$
$$e = \sqrt{(a-c)^2 + (b-d)^2}$$
$$\delta = \alpha + \beta + \tan^{-1}\frac{d-b}{c-a}$$
$$D = h \times \sin\alpha$$

In Equation (2), β denotes the angle between a segment for connecting reference points $P_1$ and $P_2$ and a segment for connecting a corrected location Q' and the reference point $P_2$, and δ denotes the angle between a segment for connecting the corrected location Q' and the reference point $P_1$ and a segment horizontally extending from the reference point $P_1$. Further, D denotes the distance between the corrected location Q' and the reference point $P_1$. Furthermore, a and b denote the actual coordinates of the reference point $P_1$ and can be obtained from the geographic object DB of the storage unit 140. c and d denote the actual coordinates of the reference point $P_2$ and can be obtained from the geographic object DB of the storage unit 140.

The location determination unit 170 can obtain coordinates Q' (x, y) of the corrected location by applying the values calculated in Equations (1) and (2) to Equation (3):

$$x=a-D\times\cos\delta, y=b-D\times\sin\delta \qquad (3)$$

Figure 7:
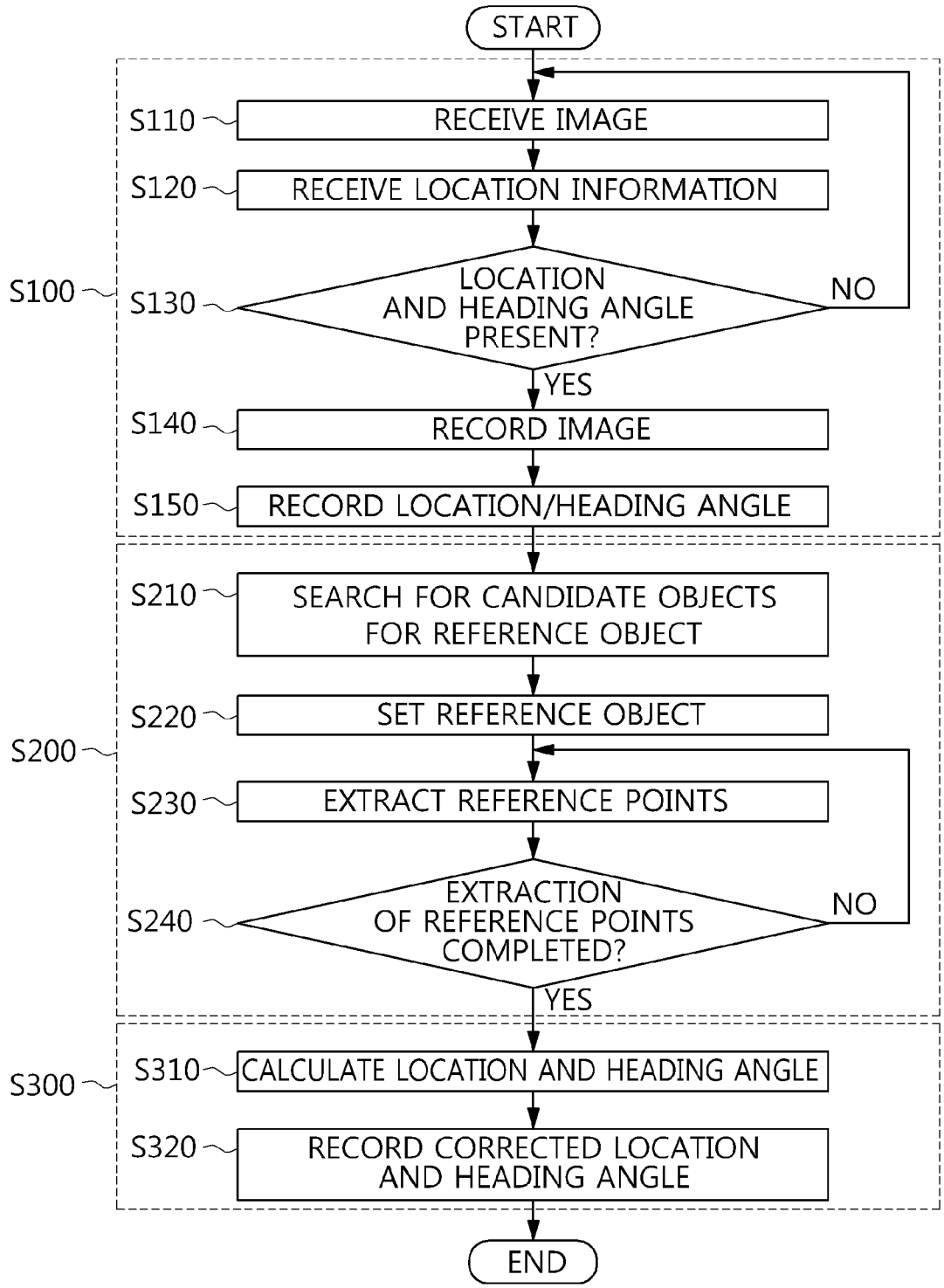
FIG. 7 is a flowchart showing the location correction method according to an embodiment of the present invention.

FIG. 7 is a flowchart showing the location correction method according to an embodiment of the present invention, and illustrates a location correction process performed by the location correction apparatus shown in FIG. 1.

Referring to FIG. 7, the location correction method according to an embodiment of the present invention mainly includes the step S100 of receiving an image and location information, the reference object search step S200 of searching the received image for a reference object, and the location correction step S300 of correcting a location using the found reference object.

The location correction apparatus is provided with a captured image (or a stored image) and metadata corresponding to the captured image at step S110. In this case, when the camera is provided in the location correction apparatus, the location correction apparatus can be provided with an image captured by the provided camera. Further, the location correction apparatus is provided with the location information of the captured image at step S120. Here, the location information may include information about a location and a heading angle at which the image was captured, and refers to the initial location information.

Thereafter, the location correction apparatus determines whether location information, heading angle information, etc. corresponding to the provided image are normally present at step S130. If it is determined that the location information, the heading angle information, etc. are normally present, the location correction apparatus records the received image at step S140, and also records the location information and the heading angle information at step S150.

In contrast, the location correction apparatus re-performs steps S110 and S120 if it is determined that location information, heading angle information, etc. are not normally present.

Thereafter, the location correction apparatus searches a pre-stored geographic object DB for one or more candidate objects that are to be set as a reference object among objects included in the image, by using various types of information such as the provided image, the location information, the heading angle, and the metadata, at step S210. Here, the geographic object DB includes geographic information, the accuracy of which has been verified by taking actual measurements.

The location correction apparatus sets a reference object to be used to correct the location among the one or more candidate objects found in this way at step S220. In this case, the location correction apparatus can set an object located closest to the capturing location, among objects corresponding to the one or more candidate objects found in the captured image, as the reference object.

Thereafter, the location correction apparatus detects the contour of the object set as the reference object, and then extracts reference points based on the detected contour at step S230.

The location correction apparatus determines whether the extraction of the reference points of the reference object has been completed at step S240, and re-performs step S230 if it is determined that the extraction of the reference points has not yet been completed.

As described above, after the reference points for the reference object included in the image have been extracted, the location correction apparatus calculates a heading angle (a capturing direction angle) and a corrected location using the above Equations (1) to (3) at step S310, corrects the initial location information received at step S120 based on the calculated correction location, and records information about the corrected location at step S320.

According to the present invention, the accurate location is calculated using information such as a contour and/or surfaces extracted from a building or the like included in a captured image, metadata included in the image, and geographic object data stored in a geographic information DB, and then measured initial location information is corrected.

Therefore, the present invention can improve positioning accuracy and can be applied to high-quality location-based services or space information services thanks to the improved accuracy.

As described above, in the location correction apparatus and method according to the present invention, the configurations and schemes in the above-described embodiments are not limitedly applied, and some or all of the above embodiments can be selectively combined and configured so that various modifications are possible.

What is claimed is:

1. A location correction apparatus comprising one or more computers configured to implement:
    a reference object search unit for searching a pre-stored geographic object database (DB) for one or more objects corresponding to objects included in a captured image and setting a reference object to be used to correct a location among the one or more objects that have been found;
    a reference point extraction unit for setting reference points from the set reference object; and
    a location determination unit for obtaining an actual distance between the reference points and calculating a location using the actual distance, a distance between the reference points included in the captured image, and metadata of the captured image;
    wherein the location determination unit calculates the actual distance between the reference points using actual coordinates of the reference points included in the captured image, calculates an angle between the reference points and a capturing location or origin, and calculates the location using the actual distance, the distance between the reference points in the captured image, an angle of view of the captured image, a size of the captured image, and the angle between the reference points and the capturing location or origin.

2. The location correction apparatus of claim 1, wherein the reference object search unit sets an object located closest to a capturing location of the captured image, among the found one or more objects, as the reference object.

3. The location correction apparatus of claim 1, wherein the reference point extraction unit extracts a contour of the set reference object from the captured image and sets at least two corners of the extracted contour as the reference points.

4. The location correction apparatus of claim 1, wherein the location determination unit corrects an obtained initial location using the calculated location.

5. A location correction method comprising:
    receiving information about an initial location and an image captured at the initial location, the information including metadata associated with the image;
    searching a geographic object database (DB) for one or more objects corresponding to objects included in the captured image, and setting a reference object among the one or more objects that have been found; and
    calculating a location at which the image was captured using actual geographic information of the reference object and information about the captured image;
    wherein the calculating the location at which the image was captured comprises: calculating an actual distance between reference points included in the captured image using actual coordinates of the reference points included in the captured image, calculating an angle between the reference points and a capturing location or origin, and calculating the location at which the image was captured using the actual distance, a distance between the reference points in the captured image, an angle of view of the captured image, a size of the captured image, and the angle between the reference points and the capturing location or origin.

6. The location correction method of claim 5, wherein the receiving the information about the initial location and the image captured at the initial location is configured to receive the initial location information, heading angle information, and metadata of the captured image.

7. The location correction method of claim 5, wherein the setting the reference object comprises:
- searching the geographic object DB for one or more candidate objects to be set as the reference object among the objects included in the captured image;
- setting the reference object among the found one or more candidate objects;
- extracting a contour of the set reference object; and
- setting at least two reference points based on the extracted contour.

8. The location correction method of claim 7, wherein the setting the reference object among the found one or more candidate objects is configured to set an object located closest to the initial location, among the one or more candidate objects, as the reference object.

9. The location correction method of claim 7, wherein the calculating the location at which the image was captured further comprises:
- correcting the initial location information using the calculated location at which the image was captured.

* * * * *